March 16, 1965 H. HEILBRUN 3,173,498
CULTIVATORS
Filed June 17, 1963 2 Sheets-Sheet 1
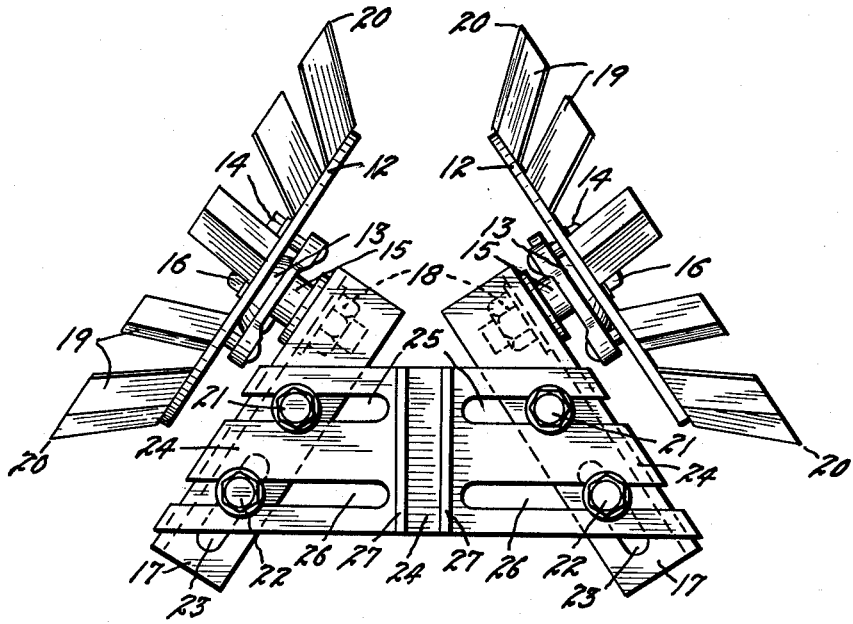
Fig. 1
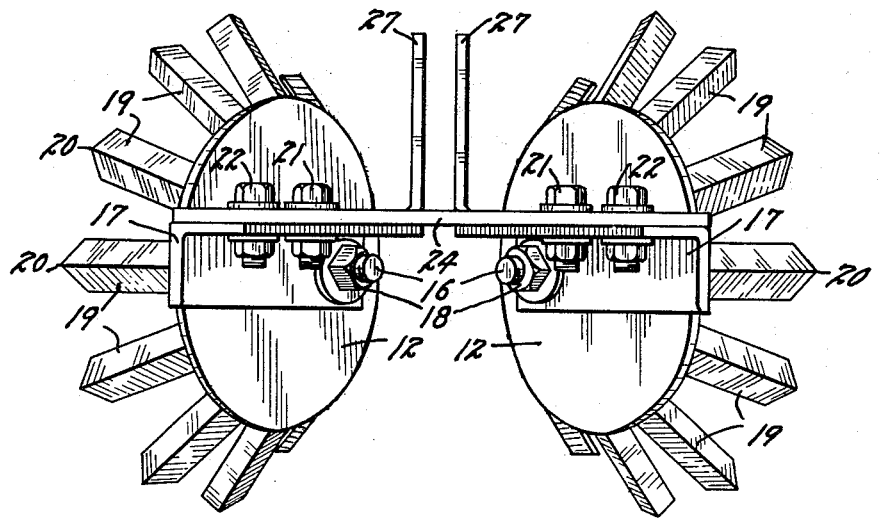
Fig. 2
INVENTOR
HAROLD HEILBRUN
BY
ATTORNEY

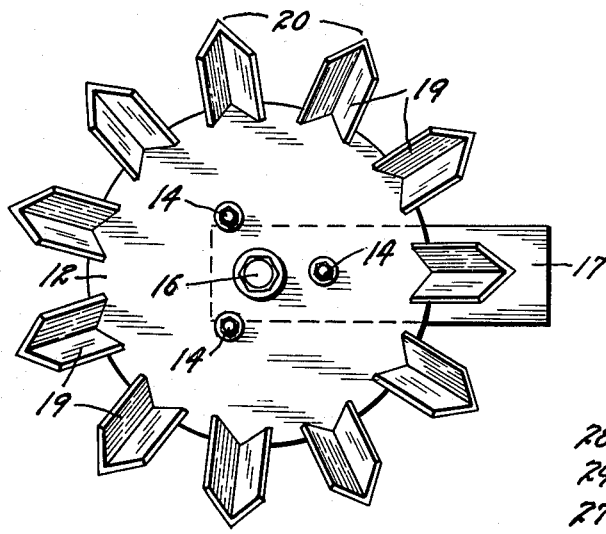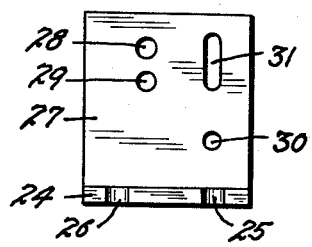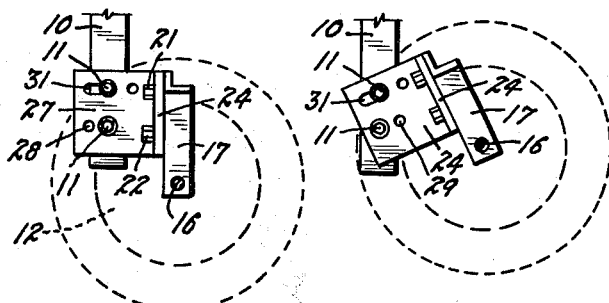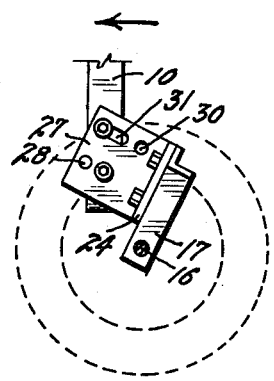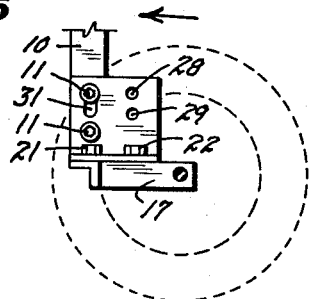

United States Patent Office 3,173,498
Patented Mar. 16, 1965

3,173,498
CULTIVATORS
Harold Heilbrun, Rte. 1, Gering, Nebr.
Filed June 17, 1963, Ser. No. 288,400
6 Claims. (Cl. 172—540)

This invention relates to an agricultural cultivator and more particularly to a ground-working element for use on field cultivators.

The principal object of the invention is to provide a row cultivating element which can be mounted in multiple upon the shanks of present cultivators to simultaneously cultivate any desired number of rows and which can be quickly, easily and accurately adjusted for any desired results such as: breaking and pulverizing clods and crust; forming hills or ridges and intervening furrows of any desired size; pushing soil under and around growing plants without damage to the plants; sweeping soil away from the plants for weeding; breaking crusted ground around rows of beets to facilitate accurate thinning, etc.

Another object is to provide a cultivating element which will rotate as the cultivator moves forwardly to prevent the accumulation of trash and to provide an element which will enter and completely work the ground with a minimum absorption of power.

Other objects and advantages reside in the detail construction of the invention, which is designed for simplicity, economy, and efficiency. These will become more apparent from the following description.

In the following detailed description of the invention, reference is made to the accompanying drawing which forms a part hereof. Like numerals refer to like parts in all views of the drawing and throughout the description.

In the drawing:

FIG. 1 is a top plan view of the improved cultivating element;

FIG. 2 is a front elevational view thereof;

FIG. 3 is a detail face view of a cultivating wheel of the type employed in the cultivating element;

FIG. 4 is a detail side elevational view of a mounting bracket member employed for adjustably mounted two of the cultivating wheels of FIG. 3 on the element and adjustably mounting the element on a conventional cultivator shank; and FIGS. 5, 6, 7 and 8 are diagrams to be described later, showing ways in which the bracket member may be mounted on the cultivator shanks.

Conventional cultivators are provided with a cultivator beam extending transversally of a plurality of crop rows. Vertical shanks are adjustably secured, at row spacing, along the beam and carry at their lower extremities selected cultivating elements such as shoes, plows, harrows, discs, etc. Such a shank is indicated on the drawing at 10 provided with two attachment bolts 11 for attachment of a cultivating element thereto.

This improved cultivating element employs two of the cultivating wheels of FIG. 3. The wheels are similar in size and construction and each comprises a flat circular disc 12 (preferably 8" in diameter) bolted concentrically to a conventional ball-bearing hub 13 by means of suitable mounting bolts 14. The hub rotates freely upon a stationary shaft sleeve 15 which fixedly surrounds an axle bolt 16.

A plurality of angularly positioned cultivating elements or teeth 19 extend radially from the disk 12. The teeth are formed by cutting a standard angle iron (preferably 1" angle) into short pieces (preferably 2½" long). The cuts at each extremity of each piece are parallel and at an angle of 45° to the axis of the piece and are so positioned that one extremity of each piece terminates in a relatively sharp point 20 at the apex of the angle iron and the other extremity terminates in two relatively sharp points on the two legs thereof. The latter 45° extremities of the pieces are placed flat against, and welded to, one face of the disc 19 in uniformly spaced relation and in radial planes adjacent the periphery, thereof so as to form teeth 19 extending radially beyond the circumference of the disc and at an angle of 45° to the plane of the disc. The outer extremities of the teeth lie in a common plane parallel to the disc and spaced therefrom (preferably approximately 2").

The axle bolt 16 passes through a wheel angle 17 (preferably formed from 2" angle iron). An axle nut 18 on the bolt 16 draws the shaft sleeve 15 fixedly against the vertical leg of the wheel angle 17 so that the disc 12 may freely rotate relative to the latter angle. The horizontal leg of each wheel angle is punched or drilled to receive two clamp bolts 21 and 22. The bolt adjacent the axle bolt 16, designated 21, passes through a plain bolt hole in the horizontal leg while the bolt distant from the axle bolt, designated 22, passes through an elongated bolt hole 23 in the horizontal leg.

The clamp bolts 21 and 22 serve to clamp two of the wheel angles 17, with their attached cultivating wheels, beneath a mounting bracket member 24, the extremities of which are oppositely inclined so that the front edge thereof is longer than the back edge. The bracket member 24 is provided with longitudinal, rear bolt slots 25 extending inwardly from the opposite extremities thereof for receiving the clamp bolts 21 of two wheel angles and with similar, parallel forward bolt slots 26 for receiving the bolts 22 of the wheel angles 17. Two transversally extending, parallel, shank plates 27 are welded to and extend perpendicularly from the mid-length of the bracket member 24. The shank plates 27 are spaced apart to receive one of the cultivator shanks 10 therebetween, and are provided with bolt holes 28, 29, 30 and 31, to receive the shank bolts 11. The hole 31 is elongated and the holes 28 and 29 are aligned parallel to and opposite the extremities, respectively, of the elongated hole 31. The hole 30 is positioned in alignment with the elongated hole 31.

By varying the positions of the shank bolts 11 in the bolt holes 28, 29, 30 and 31, as shown in FIGS. 5–8, the wheel supporting angles 17 may be preset in any desired horizontal and vertical planes and by varying the positions of the mounting bolts 21 and 22 in the bolt slots 25 and 26 of the bracket member 24 any desired relative angular positions of the supporting angles 17 may be pre-set for any desired result. For instance, for ridging, the setting shown in FIG. 5 may be used. When in this setting, the teeth are in their closest position immediately below the shanks 10 and the bolts 21 and 22 can be adjusted to place the teeth 19 of the opposite wheels at any angle to each other from a vertical spaced relation to an outwardly flared relation depending upon the type and width of ridge desired. A more extreme setting is shown in FIG. 6 in which the teeth are in their closest relative position rearwardly of the shanks 10 so that they will break, gather, sweep and push the soil under and around the plants as they crush any hard crust which may be present. When set as shown in FIG. 7 the opposite teeth will sweep away from each other taking soil away from the plants to remove weeds and soften the soil for efficient thinning such as sugar beet crops. For complete surface smoothing, clod and crust breaking the setting shown in FIG. 8 may be used to cause the implement to follow the shanks with the teeth at any desired position relative to the ground surface. The open spaces between the teeth allow the soil and crust to break up and sift through between the teeth to provide a pulverizing action which cannot be accomplished with discs or colters. The sharp teeth readily enter and break up ground crusts into small pieces whereas discs raise the crust and form large crust clods.

While a specific form of the invention has been described and illustrated herein, it is to be understood that the same may be varied within the scope of the appended claims, without departing from the spirit of the invention.

Having thus described the invention what is claimed and desired to be secured by Letters Patent is:

1. A cultivating implement for attachment to the shank of a cultivator comprising: an elongated mounting bracket plate; shank plates extending upwardly from the mid-portion of said bracket plate in parallel relation to receive said shank therebetween; a wheel angle member clamped upwardly against and below each extremity of said bracket plate; a ground working element comprised of a circular disc; a shaft-receiving hub concentrically mounted on said disc; and a plurality of spaced-apart teeth mounted on and extending outwardly from said disc beyond the periphery thereof each of said teeth lying in a plane radial to said disc and at an angle to the plane of said disc, the hub of each disc being rotatably mounted on a wheel angle member to rotate in a plane at a right angle to the plane of said bracket plate and parallel to the longitudinal axis of the angle member.

2. A ground working element for use on field cultivators comprising: a circular disc; a shaft-receiving hub concentrically mounted on said disc; and a plurality of spaced-apart teeth mounted on and extending outwardly from said disc beyond the periphery thereof each of said teeth lying in a plane radial to said disc and at an angle to the plane of said disc, said teeth comprising similar pieces of angle iron of uniform length, the opposite extremities of said pieces being similarly cut at an angle other than 90° to their longitudinal axes so as to lie in parallel inclined planes to form a single point at the apex ridge of said angle iron at the outer extremity of each piece and a point on each leg of said angle iron at the inner extremity of each piece, said inner extremities being welded to one face of said disc adjacent the periphery of the latter with apex ridges faced diametrically outward so that said single points will first contact the ground, the inclined plane of the outer extremities of the pieces lying at an angle of substantially 45° to the longitudinal axis of said pieces and the plurality of pieces terminating in a common plane positioned parallel to said disc.

3. A cultivating implement for attachment to the shank of a cultivator comprising: an elongated mounting bracket plate; shank plates extending upwardly from the mid-portion of said bracket plate in parallel relation to receive said shank therebetween; a wheel angle member clamped upwardly against and below each extremity of said bracket plate; a pair of ground working elements each comprising a circular disc; a shaft-receiving hub concentrically mounted on said disc; and a plurality of spaced-apart teeth mounted on and extending outwardly from said disc beyond the periphery thereof, each of said teeth lying in a plane radial to said disc and at an angle to the plane of said disc, the hub of each disc being rotatably mounted on one of said wheel angle members so as to rotate in a plane at a right angle to the plane of said bracket plate and parallel to the longitudinal axis of the angle member.

4. A cultivating implement as described in claim 3 having a plurality of bolt holes in said shank plates and a pair of attachment bolts extending through selected ones of said bolt holes and adapted to extend through a shank positioned between said shank plates, said plurality of bolt holes being so arranged that said bracket plate may be secured to said shank at any angle from a vertical to a horizontal position.

5. A cultivating implement as described in claim 3 in which said mounting plate is provided with two parallel bolt slots extending inwardly from each of its extremities and having clamp bolts of less diameter than the width of said slots extending upwardly from each of said angle members into each of said slots for clamping said angle members to said mounting plate at any desired angles relative to each other and any desired spacing from each other.

6. A cultivating implement as described in claim 5 in which one of the clamp bolts in each angle member passes through an elongated bolt slot in that angle member to allow the angle member to be pivotally rotated about the other clamp bolt in that angle member for pre-setting the relative angle between said mounting member and said angle member.

References Cited by the Examiner

UNITED STATES PATENTS

| 369,163 | 8/87 | Clark | 172—555 |
| 1,355,454 | 10/20 | Degge | 172—655 |
| 1,625,087 | 4/27 | McClintock | 172—555 |
| 1,713,744 | 5/29 | Darby | 172—655 |
| 2,732,785 | 1/56 | Kleppe | 172—556 |
| 3,110,275 | 11/63 | Bonney | 172—556 X |

FOREIGN PATENTS 384,813  11/23  Germany.

T. GRAHAM CRAVER, *Primary Examiner.*